Nov. 20, 1962     T. A. TOLL     3,064,928
VARIABLE SWEEP WING AIRCRAFT
Filed Aug. 23, 1960
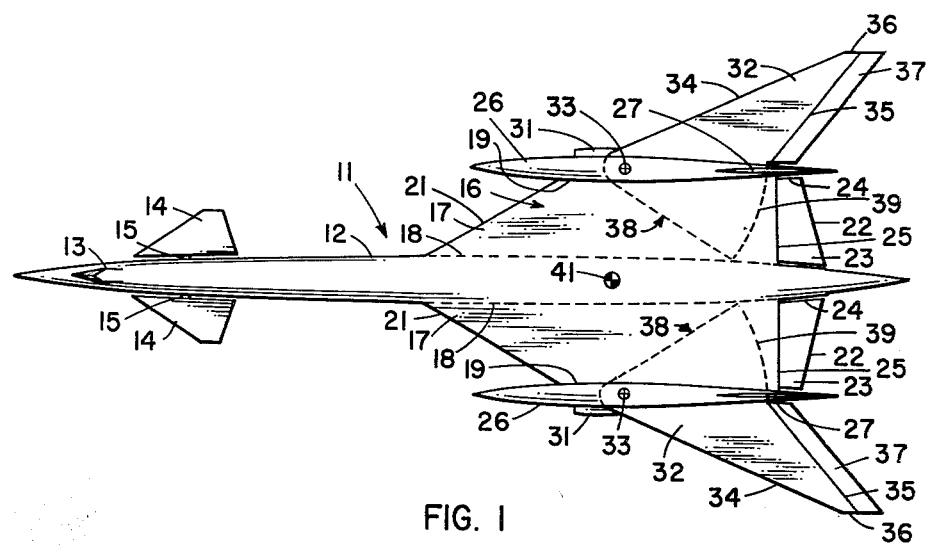
FIG. 1
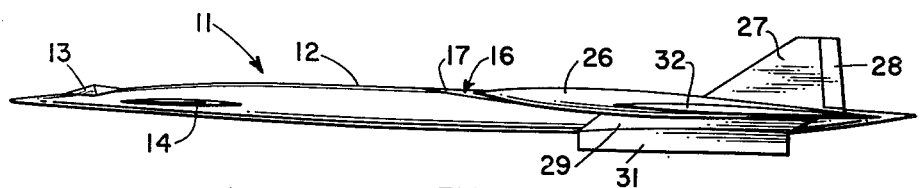
FIG. 2
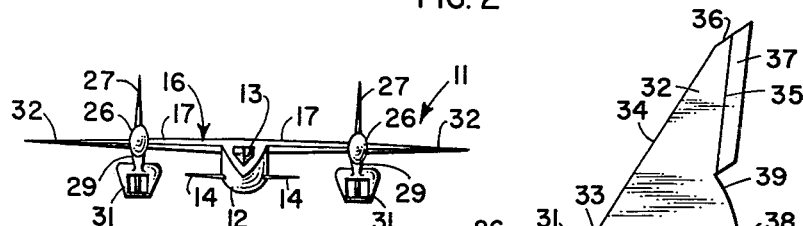
FIG. 3
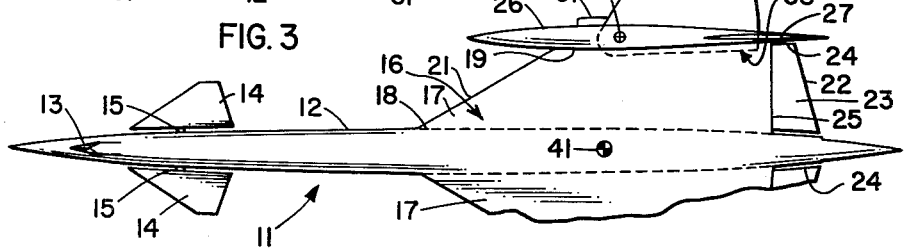
FIG. 4
INVENTOR
THOMAS A. TOLL
BY 
ATTORNEYS

3,064,928
VARIABLE SWEEP WING AIRCRAFT
Thomas A. Toll, Lancaster, Calif., assignor to the United States of America as represented by the Administrator of the National Aeronautics and Space Administration
Filed Aug. 23, 1960, Ser. No. 51,473
5 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles, and more particularly to supersonic airplanes having variable sweep wing sections.

The invention is considered to be particularly useful for application to civil and military transport or military bombardment aircraft having high supersonic speed capabilities on the order, say, of Mach 3.0. The airframe configuration requirements for efficient supersonic flight, however, especially in the indicated range, are simply not compatible with the configuration requirements for efficient low speed flight, takeoff and climb, or descent and landing. The optimum wing planform for low speed flight, and conventional takeoff and landing, is considered to include a long span, narrow chord wing having a low sweep angle. The total lift developed by a lifting wing, other factors such as angle of attack and dynamic pressure being equal, is substantially proportional to aspect ratio, which is defined as the square of the span of the wing divided by the surface area thereof. It will be immediately apparent, therefore, that a long narrow wing may develop many multiples of the total lift obtainable with a short broad wing of the same plan area, thereby reducing the angle of attack required for landing and takeoff. Moreover, the drag due to lift is reduced as the aspect ratio is increased, thereby providing high aerodynamic efficiency for subsonic cruise. The high aspect ratio wing, of course, permits relatively short takeoff and landing roll, as well as low speed climb to altitude, thereby making feasible the use of small and relatively rough airports, which may be located even in fairly densely populated and built up areas. For transonic and supersonic flight, however, highly swept leading edge, low aspect ratio wings are considered preferable, since aerodynamic drag may be greatly reduced thereby, and other advantages enumerated hereinafter may also be obtained. During supersonic cruise at high altitudes, at which fuel consumption per mile traveled is minimized, at the high angles of attack required the highly swept leading edge wing configuration develops a comparatively low drag coefficient while developing the required lift coefficient. It has been experimentally shown that lift/drag ratios of from 6.0 to 8.0 may be obtained with the highly swept leading edge wing at supersonic high altitude cruise, making such flights economically feasible even in the case of commercial transport aircraft. The highly swept leading edge wing configuration is also preferred for supersonic flight at low levels, where the combination of high dynamic pressure and the high frequency end of the gust spectrum may establish the structural strength requirements of an aircraft, since the gust loads imposed on a highly swept leading edge wing are much smaller than on a more or less straight wing, due to a smaller change in lift force resulting from change in angle of attack. This result is due to the fact that a moving aircraft experiences atmospheric turbulence only as sudden changes in angle of attack, which may be said to be the direction of the resultant of the vertical component of gust velocity and the horizontal component of aircraft velocity. It is, of course, generally undesirable to operate supersonic aircraft at low levels; an exception being the case of military aircraft operating over enemy territory where low altitude flight is considered to reduce the vulnerability of the aircraft to attack and to increase the chances of avoiding radar detection; due to the fact that extensive shock wave damage may be experienced by buildings and like structures adjacent the flight path of an aircraft flying at supersonic speeds below an altitude of, say, 100 feet.

It will now be apparent, from the foregoing discussion, that an aircraft of the swept leading edge wing type designed solely on the basis of high supersonic, high performance flight simply will not perform satisfactorily for subsonic cruise, takeoff and landing. Even present day low supersonic aircraft are designed with aspect ratios higher than that considered optimum for supersonic cruising flight in order to make takeoff and landing feasible, and the takeoff ground roll distance requirements of around 10,000 feet for these aircraft are nearing an upper limit. These low supersonic aircraft must also climb to cruise altitude at subsonic speeds to prevent heavy shock wave ground damage, at the expense of increased fuel consumption, since the relatively low aspect ratio of the wings thereof results in increased drag due to lift while in the climb. The severity of this problem may be exemplified by a typical fuel consumption record of a low supersonic swept wing transport on a transatlantic flight, where normally 30 percent or more of the total fuel will be expended in takeoff and climb to cruise altitude at subsonic speeds.

The most promising line of attack taken in the past to overcome the configuration incompatibility problem outlined hereinbefore involves in flight variation of wing planform geometry, and particularly simultaneous variation of both wing sweep and aspect ratio. Intensive investigation of this concept began with the extensive flight testing early in the previous decade by the United States government of one such variable aspect ratio aircraft. This aircraft was provided with in flight variable sweep wings which were movable in their entirety about longitudinally translatable pivot points closely proximate to the wing planform plane of symmetry. The complete flight test program of this aircraft revealed unsatisfactory stability and control characteristics, however, and it was determined that such elaborate and massive control mechanism for varying wing sweep and translating the wing pivots would be required to convert the design into a useful operational aircraft that performance penalties due to added weight resulting from the use thereof would more than offset the advantages derivable from the use of variable wing sweep. The test program on this aircraft demonstrated the feasibility of in flight wing rotation, however, and also pointed out the desirability of eliminating the need for wing translation. Subsequently, other variable sweep wing planforms were investigated both in this country and abroad by persons concerned with producing a fully operational aircraft design capable of obtaining the advantages, while avoiding the penalties, associated with variable wing sweep. These programs, over a period of several years, produced generally negative results, leading to a general rejection of the variable wing sweep concept by the manufacturers and users of supersonic aircraft. In view of the potential of this concept, however, research efforts to overcome the deficiences inherent in previously proposed variable sweep wing configurations continued, finally resulting in the invention by W. J. Alford, Jr. and E. C. Polhamus of one variable sweep wing planform which, as disclosed in their copending application for U.S. Letters Patent filed July 7, 1960, Serial No. 41,455, is considered to provide, in an aircraft having a conventional fuselage carrying propulsion means therein, forwardly located wings, and a conventional aft empennage arrangement, a successful and fully operational design for varying aspect ratio and wing sweep which eliminates the necessity of providing means for longitudinally shifting wing panel pivot points. While the aforementioned invention is considered far superior to the variable sweep wing configurations proposed theretofore, it is well known in the art that the aircraft planform utilizing forwardly located wings and an aft empennage arrangement is not as aerodynamically efficient during supersonic cruise as an aircraft planform utilizing a rearwardly positioned substantially delta wing configuration. It will now be apparent that a substantially delta wing planform aircraft, if provided with wing sweep and aspect ratio variation capabilities according to the basic inventive concept disclosed in the copending application of Alford et al., would obviously represent a significant forward step in the field of high supersonic atmospheric flight.

Accordingly, it is an object of the present invention to provide a new and improved variable aspect ratio delta wing planform for an aircraft.

Another object of the instant invention is the provision of a new and improved variable leading edge sweep delta wing planform for a supersonic aircraft.

A still further object of the instant invention is the provision of a new and improved variable sweep delta wing planform for a supersonic aircraft operable to vary aspect ratio without adversely affecting the control and stability characteristics of the aircraft.

Another still further object of the present invention is the provision of a new and improved variable sweep delta wing planform for a supersonic aircraft for maximizing aspect ratio for subsonic takeoff, climb, cruise, descent, and landing.

Still another object of the instant invention is the provision of a new and improved variable sweep delta wing planform for a supersonic aircraft for minimizing aspect ratio during supersonic cruise.

According to the present invention, the foregoing and other objects are attained by providing, in a powered aircraft having a fuselage including forwardly positioned substantially horizontal canard stabilizer surfaces, wings projecting from each side of the aftermost length of the fuselage including fixed swept leading edge inboard panels with a substantial portion thereof located forwardly of the aircraft center of gravity, outboard panels extending outwardly from the fixed inboard panels and pivotally connected thereto for rotation in the wing areal plane to vary the leading edge sweep thereof between fairly small and fairly large angles of sweep, and fixed vertical stabilizer surfaces projecting upwardly from the inboard wing panels adjacent the outboard edges thereof.

A more complete appreciation of the invention and many of the attendant advantages thereof will be readily apparent as the same becomes better understood by reference to the following detailed description when considered in connection with the accompanying drawing wherein:

FIG. 1 is a plan view of a delta wing variable sweep aircraft with the wing thereof disposed in a low aspect ratio position;

FIG. 2 is a side elevational view of the aircraft disposed as shown in FIG. 1;

FIG. 3 is a front elevational view of the aircraft disposed as shown in FIG. 1; and, FIG. 4 is a partial plan view of the aircraft with the wing thereof disposed in a high aspect ratio position.

Referring now more particularly to the drawing, wherein like reference numerals designate identical parts throughout the several views, there is shown a variable sweep delta wing planform aircraft, generally designated by the reference numeral 11. Aircraft 11 is provided with a conventional fuselage 12 having a length to equivalent diameter, or fineness ratio, suitable for supersonic flight. A suitable control compartment or pilot's cabin 13 is also included in fuselage 12 adjacent the forward end thereof. Substantially horizontally disposed canard stabilizer surfaces 14 project outwardly from each side of fuselage 12 near the forward end thereof; each surface 14 having an airfoil section preferably taken from the supersonic family of symmetrical thin airfoils. The stabilizer surfaces 14 are of the "all movable" type; that is, each surface 14 is mounted to rotate about an axis extending transversely outwardly from the sides of fuselage 12, entering the surface 14 substantially normal to the root section at about the 50 percent station thereof, and running substantially coplanar with the mean planform plane of the surface. More particularly, a suitable connection between each of the stabilizer surfaces 14 and fuselage 12 may comprise an elongated cylindrical element 15 having its longitudinal axis collinear with the axis of rotation of the surface 14 and having one end thereof rigidly connected to the stabilizer surface root section. Substantially the entire lengths of the elements 15 are rotatably mounted within the fuselage 12; the gap between fuselage 12 and stabilizer surfaces 14 having been exaggerated in FIGS. 1 and 4 to more clearly point out the all movable nature of these stabilizer surfaces, and to show a small portion of the lengths of elements 15. The ends of elements 15 within fuselage 12 are interconnected with a suitable conventional mechanism, not shown, operable to rotate the stabilizer surfaces in either direction about the longitudinal axes of elements 15 to vary the angle of incidence of the surface for trimming the aircraft, as will be more fully explained hereinafter.

Aircraft 11 is also provided with a wing, generally designated by the reference numeral 16, projecting substantially horizontally outwardly from each side of fuselage 12 adjacent the after end thereof. The aircraft 11, as illustrated in the drawing, is of the high wing type, with the upper surface of the wing 16 substantially flush with the upper surface of the fuselage 12, although mid and low wing arrangements are also considered to fall within the scope of the invention. Wing 16 includes an inner wing section including port and starboard wing panels 17 fixedly interconnected with fuselage 12. Each wing panel 17, referring to the area thereof projecting outwardly from a side of fuselage 12, is preferably substantially trapezoidal in planform, with a root section 18 adjacent the side of fuselage 12 and a tip section 19 disposed outboard of the root section 18 in substantially parallel relation with the vertical plane of symmetry of fuselage 12. The forward extremity of the root section 18 of each wing panel 17 is positioned somewhat forwardly of the longitudinal midpoint station of fuselage 12, and the after extremity of root section 18 is positioned forwardly of the aftermost extremity of fuselage 12 a distance on the order of one tenth the total length of the fuselage. The spanwise length of each wing panel 17 between the root section 18 and the tip section 19 thereof is on the order of about twice the maximum width of fuselage 12. Each wing panel 17 includes a leading edge 21 swept back at an angle on the order of 60 degrees which connects the forward extremities of root section 18 and tip section 19 thereof, and a trailing edge 22 swept forward at an angle on the order of about 15 degrees which connects the after extremities of the root and tip sections. A rearwardly positioned section 23 of each fixed wing panel 17, however, is movably interconnected with the remainder of the panel 17 for utilization as an aircraft control surface. Accordingly, each section 23 includes a trailing edge which coincides with substantially the entire length of the trailing edge 22 of the wing panel 17, side edges 24 positioned substantially adjacent the root section 18 and tip section 19 of the panel 17 and which are separable from the fixed structure of the panel, and a forward edge 25 which lies in a plane substantially perpendicular to the longitudinal axis of fuselage 12 and which passes through the root section 18 of the panel 17 at about the 85 percent station thereof. The forward edge 25 of the section 23 connects the forward extremities of the side edges 24 thereof, and is separable from the fixed structure of the wing panel 17, but is hingedly connected thereto. It will now be apparent that the sections 23 of the fixed wing panels 17 may be rotated upwardly or downwardly about the hinged connection of the forward edge 25 thereof for service as control surfaces, and conventional actuator means, not shown, are provided for rotating the sections 23 in either direction in unison to provide aircraft pitching control.

A streamlined body 26 is connected to each fixed inner wing panel 17 along the tip section 19 thereof; each body 26 being about 50 percent greater in length than the tip section 19 of the adjacent wing panel 17, with about two thirds of this extra length projecting forwardly past the forward extremity of the tip section 19 and the remaining one third of this extra length projecting rearwardly past the after extremity of the tip section 19. The sectional area of each body 26 is a maximum in the region thereof extending along the adjoining tip section 19 from about the 20 percent station to about the 30 percent station thereof; the body 26 tapering forwardly and rearwardly from this region to substantially pointed forward and after extremities. The maximum width of each body 26 is equal to about one third the maximum width of fuselage 12, and the maximum height of the body 26 in the region of maximum width is about half again as great as the maximum width; the upper and lower extremities of the body 26 being substantially equidistantly positioned with respect to the upper and lower surfaces, respectively, of the wing panel 17 to which it is connected. Each body 26 carries a vertical stabilizer member 27 fixedly connected thereto which projects vertically upwardly from the upper surface thereof along substantially the aftermost third of the length of the body; each vertical stabilizer member 27 including a conventional rudder control surface 28 operable to provide yawing control for aircraft 11. Each body 26 also carries a pylon member 29 fixedly connected thereto which projects downwardly from the lower surface thereof. An engine nacelle or pod member 31 is fixedly connected to each pylon member 29 along a lower extremity thereof, and one or more reaction type motors are mounted in each of the pod members 31 to provide propulsive thrust for aircraft 11.

Wing 16 of aircraft 11 also includes a pair of outboard wing panels 32, one of which extends outwardly from the tip section 19 of each wing panel 17, or more specifically, from the body 26 connected to the wing panel 17 along the tip section 19 thereof, and which is suitably connected thereto for rotation in the wing planform plane about a pivot point 33 located within the body 26 to vary the sweep angle of the straight leading edge 34 thereof. The outboard wing panels 32 are shown in the low aspect ratio, supersonic flight position in FIG. 1 of the drawing. In this position, the leading edge 34 of each wing panel 32 commences at a point on the outboard side of the adjoining body 26 so located that a forward extension of the leading edge 34 through body 26 would substantially intersect the junction point of leading edge 21 of the adjacent wing panel 17 with the inboard side of body 26. The leading edge 34 of each wing panel 32 extends outwardly and rearwardly from this point on the adjacent body 26 at a sweep angle of approximately 67 degrees. Each wing panel 32 is also provided with a straight trailing edge 35 which extends outwardly and rearwardly from the outboard side of the adjoining body 26 from a point at about the 80 percent longitudinal station thereof at a sweep angle of approximately 40 to 45 degrees. These sweep angles of the leading and trailing edges of panels 32, however, may be varied as found desirable. Each wing panel 32 is also provided with a tip section 36 which, by way of example, may run rearwardly from the leading edge 34 toward the trailing edge 35, with an interior angle between the leading edge 34 and tip section 36 on the order of 160 degrees, although other suitable tip arrangements are considered to be within the scope of the invention. The outermost extremities of the wing 16 occur generally at the intersection of the outboard panel tip sections 36 and the trailing edges 35, and the semispan of the wing 16 in the low aspect ratio position of FIG. 1 is on the order of about twice the semispan of the midsection thereof defined by the fixed wing panels 17. In this position, the wing aspect ratio will be on the order of about 1.9. Each outboard wing panel 32 is further provided with a conventional aileron rolling control surface 37 positioned along substantially the entire length of the trailing edge 35 thereof, with conventional actuation means of the electro-mechanical type, not shown, provided therefor.

The outboard wing panels 32 may be swept forward about the pivot points 33 from the hereinbefore described high sweep position to the high aspect ratio position shown in FIG. 4 of the drawing. In this position, the sweep angle of the panel leading edges 34 is decreased to about 27 degrees. The structural arrangement of the wing 16 which makes feasible this variation in sweep angle will now be described. A medial slot is formed along the outboard side of each body 26, commencing at a point located somewhat forwardly of the longitudinal position of the pivot point 33 thereof, and extending rearwardly to about the point where the trailing edge 35 of the associated wing panel 32 intersects the body when the panels 32 are in the high sweep position. Each such slot communicates with a medial recess formed through the body 26 and extending into the adjacent fixed wing panel 17 between the upper and lower surfaces thereof. Each outboard wing panel 32 further includes a rigid portion, generally designated by the reference numeral 38, which is generally coplanar with the hereinbefore described portion of the panel 32 bounded by leading edge 34, trailing edge 35, and tip section 36, and which extends into the medial recess formed in the adjoining body 26 and fixed wing panel 17 through the slot formed in the body 26. At least this portion 38 of each wing panel 32 must be thin enough to move in and out of the slot in the adjacent body 26. Suitable structural connections are provided to secure portion 38 of each panel 32 within the medial recess in the adjoining body 26 and fixed wing panel 17 in such a manner that it is free to rotate about a pivot point 33 within the limits defined hereinbefore. The pivot point 33 is located on about the 15 percent chord line of each wing panel 32. It will now be apparent that as the outboard wing panels 32 are swept forward, some portion of the area thereof must enter the slots in the bodies 26, so at least this portion of the wing panels 32 must be made sufficiently thin for this purpose. The portion 38 of each outboard wing panel 32 which is movable in the medial recess in a body 26 and wing panel 17 is substantially fan-shaped and is substantially formed as a radial segment of a circle having its center at pivot point 33 and a circular outer boundary 39. The distance between pivot point 33 and boundary 39 is generally such that boundary 39 substantially connects with trailing edge 35 of the wing panel 32 at the point of intersection thereof with the adjoining body 26 when the panel 32 is positioned in the high sweep attitude. The radial width of the fan-shaped areas of portions 38 of the wing panels 32 is such that, as the wing panels 32 are positioned in the swept forward attitude, some part thereof remains in the recesses provided therefor while the remainder serves to increase the area of the wing 16, which for the wing described will provide an area increase on the order of 9 percent. With wing panels 32 in their swept forward position, the aspect ratio of wing 16 will be on the order of 4.5. The actual construction of the outboard wing panel pivotal connections, as well as the mechanism necessary to effect pivotal movement of the outboard wing panels 32, is not considered to form part of the present invention, and has been omitted in the interest of clarity.

The center of gravity 41 of aircraft 11 is located substantially in the position shown in FIGS. 1 and 4 of the drawing, and the longitudinal position of wing 16 with respect to fuselage 11, as hereinbefore described, has been selected primarily for correlation with center of gravity 41. It will be noted that the pivot points 33 of the outboard wing panels 32 are positioned only a short distance rearwardly of center of gravity 41, which may be merely a matter of a few inches. This condition exists due to a combination of factors including, providing a substantial portion of the planform area of fixed wing panels 17 forward of the aircraft center of gravity 41; controlling the sweep angle leading edge 21 of fixed panels 17; locating pivot points 33 as far outboard as possible on fixed panels 17; as well as, controlling the leading edge sweep angle for rotatable panels 32. In addition, as outboard wing panels 32 rotate from the high sweep low aspect ratio position shown in FIG. 1 to the low sweep high aspect ratio position, as shown in FIG. 4, it is apparent that any slight shift in the center of gravity will be directed toward the nose of aircraft 11 due to the shift of weight location of panels 32 to thus maintain the aircraft center of gravity 41 slightly forward of pivot points 33 at all times. Conventional programed fuel consumption also, obviously, results in no substantial change in the aircraft center of gravity during flight. Also, as mentioned heretofore, by placing pivot points 33 as far outboard on fixed panels 17 as possible, an almost straight inboard center of lift is attained during sweep variance; which, coupled with the added feature of providing a substantial portion of fixed panels 17 forward of the aircraft center of gravity 41, substantially reduces the force and mechanism required to vary wing sweep over that experienced in conventional variable sweep aircraft. Consequently, it will now be apparent that since a substantial portion of the planform area of the fixed wing panels 17 is positioned forwardly of the aircraft center of gravity 41 further advantageous results, as more fully set forth hereinafter, are attainable.

A salient feature of the present invention is considered to be the simplicity of the foregoing in flight variable sweep delta wing arrangement with which adequate longitudinal and directional stability is obtained in both the high and low aspect ratio positions, and which is also conducive to the use of the horizontal canard stabilizer arrangement to secure adequate control characteristics; an objective somewhat difficult to obtain in delta wing planform aircraft. Another essential feature of the disclosed aircraft configuration is the provision of the fixed inboard wing panels 17 having a substantial portion of the area thereof positioned forwardly of the aircraft center of gravity, which makes possible the attainment of essentially the same longitudinal stability level for both the high and low aspect ratio wing positions. The area of the portions of fixed wing panels 17 positioned forwardly of the aircraft center of gravity 41, of course, contributes to aircraft instability even when the outboard wing panels 32 are swept forward, which may, however, be readily counterbalanced by upwardly acting airloads on the canard stabilizer surfaces 14. As the sweep of the outboard wing panels 32 is increased, the resulting decrease in aspect ratio and wing area, and the increase in sweep, combine to decrease the relative portion of the total lift developed on the outboard wing panels 32, and thereby increase the relative portion of the total lift carried on the portion of the fixed inboard wing panels 17 positioned forwardly of the aircraft center of gravity 41. The instability contributed by these portions of wing panels 17 is thereby increased and, for the delta configuration hereinbefore described, counteracts the increase in longitudinal stability associated with the rearward rotation of the outboard wing panels 32. It will be readily apparent, therefore, that without the provision of the wing fixed inboard panels the aircraft in the low aspect ratio attitude would become so stable that control without the provision of extremely large canard stabilizer surfaces would be unobtainable. Further, the particular placement of the outboard wing panel pivot points 33, as disclosed, is such that the shift in relative position of the wing aerodynamic center and the center of gravity 41 of the aircraft configuration illustrated as the outboard wing panels 32 rotate is minimized, with maximum longitudinal movement of the wing aerodynamic center and the aircraft center of gravity being substantially limited to a distance on the order of about 3.5 percent of the length of the mean aerodynamic chord of wing 16.

The arrangement of the control surfaces of aircraft 11 is also considered to be particularly advantageous. By forming the pitching control surfaces 23 as constituent components of the fixed inboard wing panels 17, the chord length thereof is extended to provide additional wing panel depth for accommodation of the structural components and mechanisms necessary to effect wing sweep variation. Pitching control being provided by the surfaces 23, the primary function of the canard stabilizer surfaces 14 is to permit a more rearward location of the wing 16 than could otherwise be obtained, while still achieving the desired balance between the lift-curve slope of the movable wing panels 32, and the moment arm between the aircraft center of gravity 41 and the center of pressure of these panels, in order to maintain acceptable stability for all sweep angles. Further, the airloads acting upwardly on canard stabilizer surfaces 14 contribute to the total lift developed upon aircraft 11, while the contrary would be true in the case of aircraft provided with rearwardly located horizontal stabilizer surfaces. The stabilizer surfaces 14 may also be utilized as a trimming device to maintain aircraft 11 in level flight with control surfaces 23 maintained in a neutral position, which is accomplished by merely varying the angle of incidence thereof as desired, as more particularly pointed out hereinbefore.

It will also be apparent that the bodies 26 positioned at the tips of the fixed inboard wing panels 17, while considered desirable in the aircraft configuration hereinbefore described to provide additional structural support at the junction of the relatively movable inboard and outboard wing panels 17 and 32, respectively, and which may also be adapted to carry extra fuel stores for the motors of aircraft 11, are not strictly necessary in the practice of the present invention, and could be eliminated. In such a case, vertical stabilizer members 27, pylon members 29, and outboard wing panels 32 would all be directly connected with the adjacent inboard wing panel 17.

In operation, aircraft 11 would begin its takeoff run with the wing 16 positioned in the high aspect ratio attitude shown in FIG. 4 of the drawing, and wing 16 would remain in this attitude throughout the takeoff run and the portion of the climb accomplished at subsonic speeds. The outboard panels 32 of wing 16 would then be rotated to the position shown in FIGS. 1 to 3 of the drawing for acceleration through the transonic speed range to the cruise Mach number. Upon completion of the supersonic cruise portion of the journey and deceleration of the aircraft 11 to subsonic speeds, wing panels 32 would then be swept forward to their high aspect ratio position and maintained therein during descent, loiter, and landing. Additionally, in the event of any in flight emergency requiring operation of aircraft 11 below supersonic speeds, the wing 16 may then be positioned in its high aspect ratio attitude to obtain maximum subsonic flight efficiency.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aircraft having supersonic atmospheric flight capabilities comprising a fuselage having a fineness ratio suitable for supersonic flight, a canard stabilizer surface connected to each side of said fuselage substantially adjacent the forward extremely thereof and projecting substantially horizontally outwardly therefrom, a wing carried by said fuselage in a region thereof spaced rearwardly of said canard surfaces and terminating substantially adjacent the after extremity of said fuselage, said wing including an inboard panel fixedly connected to each side of said fuselage and projecting substantially horizontally and outwardly from said side of said fuselage, each of said fixed inboard wing panels including a swept leading edge wholly positioned forwardly of the center of gravity of said aircraft, a trailing edge, and a tip section positioned substantially parallel to the longitudinal plane of symmetry of said aircraft, and an outboard wing panel including a leading edge and a trailing edge connected to each of said inboard wing panels in substantially coplanar relation therewith for rotation within predetermined limits in a substantially horizontal plane about a pivot point, each of said pivot points being located on a chord line of an outboard wing panel substantially adjacent the leading edge thereof, each of said pivot points further being located with respect to an inboard wing panel closely proximate the tip section of said inboard wing panel, and each of said pivot points being longitudinally rearwardly positioned with respect to said aircraft center of gravity and longitudinally closely proximate said aircraft center of gravity.

2. The aircraft as defined in claim 1, including a stabilizer member interconnected with the upper surface of each of said inboard wing panels substantially along a length of said tip section thereof and projecting substantially vertically upwardly from said upper surface, each of said substantially vertical stabilizer members including an aircraft yawing control surface.

3. The aircraft as defined in claim 2, wherein each of said fixed inboard wing panels includes an aircraft pitching control surface positioned adjacent said trailing edge thereof.

4. The aircraft as defined in claim 1, wherein each of said outboard wing panel leading and trailing edges are substantially straight and in each outboard wing panel are outwardly converging the length to chord distance ratio of said outboard wing panels being such that the wing aspect ratio obtained when said outboard wing panels are positioned in their most forwardly swept attitude within said predetermined limits is more than twice the wing aspect ratio obtained when said outboard wing panels are positioned in their most rearwardly swept attitude within said limits.

5. The aircraft as defined in claim 4, wherein the total planform area of said wing is a maximum when said outboard wing panels are positioned in their most forwardly swept attitude.

References Cited in the file of this patent

UNITED STATES PATENTS

| | | |
|---|---|---|
| D. 144,143 | Scott | Mar. 12, 1946 |
| 2,428,934 | Gille | Oct. 14, 1947 |
| 2,576,294 | Geraci | Nov. 27, 1951 |
| 2,670,910 | Hill | Mar. 2, 1954 |
| 2,924,400 | Ruget | Feb. 9, 1960 |
| 2,941,752 | Gluhareff | June 21, 1960 |
| 2,953,322 | Lewis | Sept. 20, 1960 |

FOREIGN PATENTS

| | | |
|---|---|---|
| 856,763 | France | Apr. 1, 1940 |

UNITED STATES PATENT OFFICE
CERTIFICATE OF CORRECTION

Patent No. 3,064,928 November 20, 1962

Thomas A. Toll

It is hereby certified that error appears in the above numbered patent requiring correction and that the said Letters Patent should read as corrected below.

Column 9, line 7, for "extremely" read -- extremity --.

Signed and sealed this 14th day of May 1963.

(SEAL)
Attest:

ERNEST W. SWIDER
Attesting Officer

DAVID L. LADD
Commissioner of Patents